(12) United States Patent
Rautschek et al.

(10) Patent No.: US 10,870,732 B2
(45) Date of Patent: Dec. 22, 2020

(54) DEFOAMER COMPOSITIONS FOR DETERGENTS

(71) Applicant: Wacker Chemie AG, Munich (DE)

(72) Inventors: Holger Rautschek, Nuenchritz (DE); Richard Becker, Ann Arbor, MI (US); Christof Brehm, Burghausen (DE)

(73) Assignee: WACKER CHEMIE AG, Munich (DE)

( * ) Notice: Subject to any disclaimer, the term of this patent is extended or adjusted under 35 U.S.C. 154(b) by 163 days.

(21) Appl. No.: 16/081,789

(22) PCT Filed: Feb. 21, 2017

(86) PCT No.: PCT/EP2017/053946
§ 371 (c)(1),
(2) Date: Aug. 31, 2018

(87) PCT Pub. No.: WO2017/148750
PCT Pub. Date: Sep. 8, 2017

(65) Prior Publication Data
US 2020/0165393 A1 May 28, 2020

(30) Foreign Application Priority Data
Mar. 1, 2016 (DE) .................. 10 2016 203 344

(51) Int. Cl.
| | | |
|---|---|---|
| *C08G 77/46* | (2006.01) | |
| *C08G 77/16* | (2006.01) | |
| *C08G 77/18* | (2006.01) | |
| *C08G 77/20* | (2006.01) | |
| *C08G 77/00* | (2006.01) | |
| *C11D 3/00* | (2006.01) | |
| *C11D 3/12* | (2006.01) | |
| *C11D 3/37* | (2006.01) | |

(52) U.S. Cl.
CPC ............. *C08G 77/46* (2013.01); *C08G 77/16* (2013.01); *C08G 77/18* (2013.01); *C08G 77/20* (2013.01); *C08G 77/80* (2013.01); *C11D 3/0026* (2013.01); *C11D 3/124* (2013.01); *C11D 3/3707* (2013.01); *C11D 3/378* (2013.01)

(58) Field of Classification Search
CPC ...... B01D 19/0409; C08G 65/04; C08K 3/36; C11D 1/721; C11D 1/722
See application file for complete search history.

(56) References Cited

U.S. PATENT DOCUMENTS

| | | |
|---|---|---|
| 3,383,327 A | 5/1968 | Sullivan |
| 3,830,738 A | 8/1974 | Cottrell |
| 4,075,118 A | 2/1978 | Gault |
| 4,983,316 A | 1/1991 | Starch |
| 5,262,088 A | 11/1993 | Hill |
| 5,288,431 A | 2/1994 | Huber et al. |
| 5,648,327 A | 7/1997 | Smerznak |
| 6,004,918 A | 12/1999 | Adams |
| 6,136,917 A | 10/2000 | Christiano |
| 6,605,183 B1 | 8/2003 | Rautschek |
| 8,536,109 B2 | 9/2013 | Delbrassinne |
| 2004/0106749 A1 | 6/2004 | Burger |
| 2008/0021152 A1* | 1/2008 | Rautschek ......... B01D 19/0404 524/588 |
| 2008/0200608 A1 | 8/2008 | Burger |
| 2010/0292353 A1 | 11/2010 | Becker |
| 2011/0209291 A1* | 9/2011 | Sadlowski ............... C11D 1/29 8/137 |

FOREIGN PATENT DOCUMENTS

| | | |
|---|---|---|
| DE | 1519987 A1 | 4/1970 |
| DE | 2107082 A1 | 8/1971 |
| DE | 102004040263 A1 | 2/2006 |
| EP | 0635564 A1 | 1/1995 |
| EP | 0663225 A1 | 7/1995 |
| EP | 0499364 B1 | 10/1996 |
| EP | 0638346 B1 | 4/1998 |
| EP | 1076073 A1 | 2/2001 |
| EP | 1167456 A1 | 1/2002 |
| EP | 1424117 A2 | 6/2004 |
| EP | 1885770 B1 | 10/2008 |
| EP | 2253364 A2 | 11/2010 |
| EP | 2781247 A1 | 9/2014 |
| GB | 2350117 A1 | 11/2000 |
| JP | 7508544 A | 9/1995 |
| JP | 10216406 A2 | 8/1998 |
| JP | 2008509811 A | 4/2008 |
| WO | WO06018145 A1 | 2/2006 |
| WO | WO06128624 A1 | 12/2006 |
| WO | WO12134651 A1 | 10/2012 |
| WO | WO14066308 A1 | 5/2014 |
| WO | WO14066309 A1 | 5/2014 |
| WO | WO15022165 A1 | 2/2015 |

\* cited by examiner

*Primary Examiner* — Kuo Liang Peng
(74) *Attorney, Agent, or Firm* — Brooks Kushman P.C.

(57) ABSTRACT

Defoamer preparations contain a polyorganosiloxane having aryl groups bonded to silicon at a ring carbon, filler particles and/or silicone resin particles, and a polyoxyalkylene polyether containing oxypropylene moieties. In addition to being efficient and compatible, the defoamer compositions retain their efficiency, especially in liquid detergents, after storage.

18 Claims, No Drawings

DEFOAMER COMPOSITIONS FOR DETERGENTS

CROSS REFERENCE TO RELATED APPLICATIONS

This application is the U.S. National Phase of PCT Appln. No. PCT/EP2017/053946 filed Feb. 21, 2017, which claims priority to German Application No. 10 2016 203 344.1 filed Mar. 1, 2016, the disclosures of which are incorporated in their entirety by reference herein.

BACKGROUND OF THE INVENTION

1. Field of the Invention

The invention relates to defoamer compositions comprising specific polysiloxanes and polyethers, and to the use thereof for defoaming aqueous media, especially aqueous surfactant formulations.

2. Description of the Related Art

In many liquid systems, especially aqueous systems which include surface-active compounds either as wanted or else unwanted constituents, problems due to foaming may occur if these systems are brought into more or less intensive contact with gaseous substances, as for example when sparging wastewaters, when vigorously stirring liquids, in distillation, washing or coloring operations, or during dispensing procedures.

Controlling this foam may be accomplished mechanically or through the addition of defoamers. In this context, siloxane-based defoamers have been found to be particularly useful. Siloxane-based defoamers are prepared, for example, according to DE-B 15 19 987 by heating of hydrophilic silica in polydimethylsiloxanes.

Defoamers based on polydimethylsiloxanes have the disadvantage that polydimethylsiloxanes have poorer compatibility with most surfactant systems, for example wetting agents or liquid washing compositions, and tend to separate out, which is very undesirable. There have therefore been many efforts to find defoamers which have good compatibility in liquid washing compositions and have good efficacy even after storage.

The use of self-emulsifying defoamers (U.S. Pat. No. 4,075,118 A) leads to good compatibility, but limited efficacy. Attempts have therefore been made to counteract particularly the loss of action of the defoamers in the course of storage in the liquid washing composition on the basis of branched high-viscosity siloxanes (EP 499364 B1, EP 635564 A1). The use of polyether-siloxanes (U.S. Pat. No. 4,983,316 A), the use of nonaqueous emulsions (EP 638346 B1), and the use of solvents in combination with Al soaps or Mg soaps (U.S. Pat. No. 6,004,918 A) has likewise been tried. Use of alkylaryl oils in combination with branched polyethersiloxanes and polyether-modified MQ resins (U.S. Pat. No. 8,536,109 B2) has likewise been suggested.

A factor common to these technical solutions is that the balance between costs, compatibility, efficacy and long-term stability is unsatisfactory.

It is consequently an object of the present invention to provide defoamer formulations that are producible in a simple and inexpensive manner, and have good compatibility with liquid washing compositions and good efficacy even after storage.

SUMMARY OF THE INVENTION

This object is achieved by formulating defoamer compositions comprising a defoamer compound comprising liquid polyorganosiloxanes having directly silicon-bonded aromatic radicals, silicone resins and/or fillers, and defined polyethers and optionally polyethersiloxanes.

DETAILED DESCRIPTION OF THE PREFERRED EMBODIMENTS

The invention thus provides defoamer compositions comprising
(A) a defoamer compound comprising
(a1) at least one organosilicon compound having units of the formula $$R_a(R^1O)_b R^2_c SiO_{(4-a-b-c)/2} \quad (I)$$

in which
R may be the same or different and is a hydrogen atom or a monovalent, SiC-bonded, optionally substituted, aliphatic hydrocarbyl radical or aromatic hydrocarbyl radical bonded to the silicon atom via aliphatic groups,
$R^1$ may be the same or different and is a hydrogen atom or a monovalent, optionally substituted hydrocarbyl radical,
$R^2$ may be the same or different and is a monovalent, optionally substituted, aromatic hydrocarbyl radical bonded to the silicon atom via a ring carbon atom,
a is 0, 1, 2 or 3,
b is 0, 1, 2 or 3 and
c is 0, 1, 2 or 3,
with the proviso that the sum total of a+b+c is not more than 3 and, in 1-100%, preferably in 10-60%, more preferably in 20-40%, of all units of the formula (I), c is different than 0 and, in at least 50% of all units of the formula (I), the sum total of a+b+c in the organosilicon compound is 2,
(a2) at least one additive selected from
(a21) filler particles, preferably silicon dioxide, silicas, titanium dioxide or aluminum oxide, and/or
(a22) organopolysiloxane resin consisting of units of the formula $$R^3_d(R^4O)_e SiO_{(4-d-e)/2} \quad (II)$$

in which
$R^3$ may be the same or different and is a hydrogen atom or a monovalent, optionally substituted, SiC-bonded hydrocarbyl radical,
$R^4$ may be the same or different and is a hydrogen atom or a monovalent, optionally substituted hydrocarbyl radical,
d is 0, 1, 2 or 3 and
e is 0, 1, 2 or 3,
with the proviso that the sum total of d+e is not more than 3 and, in less than 50% of all units of the formula (II), the sum total of d+e in the organopolysiloxane resin is 2,
and optionally
(a3) an organosilicon compound having units of the formula $$R^5_g(R^6O)_h SiO_{(4-g-h)/2} \quad (III)$$

in which
$R^5$ may be the same or different and has a definition specified for R,
$R^6$ may be the same or different and has a definition specified for $R^1$,
g is 0, 1, 2 or 3 and
h is 0, 1, 2 or 3, with the proviso that the sum total of g+h is not more than 3 and, in at least 50% of all units of the formula (III), the sum total of g+h in the organosilicon compound is 2, (B) polyoxyalkylenes selected from the group of the polypropylene glycols, terminally etherified or esterified polypropylene glycols, polypropylene glycol/polyethylene glycol copolymers, terminally etherified or esterified polypropylene glycol/polyethylene glycol copolymers, and mixtures thereof, optionally (C) polyether-modified siloxanes, optionally (D) organic compounds, and optionally (F) further additives.

Examples of R radicals are alkyl radicals such as the methyl, ethyl, n-propyl, isopropyl, n-butyl, isobutyl, tert-butyl, n-pentyl, isopentyl, neopentyl, and tert-pentyl radicals, hexyl radicals such as the n-hexyl radical, heptyl radicals such as the n-heptyl radical, octyl radicals such as the n-octyl radical and isooctyl radicals such as the 2,2,4-trimethylpentyl radical, nonyl radicals such as the n-nonyl radical, decyl radicals such as the n-decyl radical, dodecyl radicals such as the n-dodecyl radical; alkenyl radicals, such as the vinyl and the allyl radical; cycloalkyl radicals such as cyclopentyl, cyclohexyl, cycloheptyl and methylcyclohexyl radicals, and aromatic groups bonded via aliphatic groups to the silicon atom, such as the benzyl radical, phenylethyl radical, and the 2-phenylpropyl radical.

Examples of substituted R radicals are 3,3,3-trifluoro-n-propyl, cyanoethyl, glycidyloxy-n-propyl, polyalkylene glycol-n-propyl, amino-n-propyl, aminoethylamino-n-propyl and methacryloyloxy-n-propyl radicals.

The R radical is preferably a hydrogen atom or is a monovalent, optionally substituted aliphatic hydrocarbyl radical having 1 to 30 carbon atoms, more preferably is a monovalent aliphatic hydrocarbyl radical having 1 to 4 carbon atoms, and most preferably is the methyl radical.

Examples of the $R^1$ radical are the hydrogen atom and the radicals stated for the R and $R^2$ radicals.

The $R^1$ radical is preferably a hydrogen atom or a monovalent, optionally substituted hydrocarbyl radical having 1 to 30 carbon atoms, more preferably a hydrogen atom or a monovalent hydrocarbyl radical having 1 to 4 carbon atoms, most preferably the methyl or ethyl radical.

Examples of $R^2$ are aryl radicals such as phenyl, tolyl, xylyl, cumyl, naphthyl and anthracyl radicals. The $R^2$ radical is preferably the phenyl radical.

Preferably 10 to 100 mol %, more preferably 15 to 50 mol %, of the SiC-bonded radicals in component (a1) are $R^2$ radicals.

Examples of $R^3$ radicals are the hydrogen atom and the radicals stated for the R and $R^2$ radicals.

Preferably, the $R^3$ radical is a monovalent, optionally substituted hydrocarbyl radical having 1 to 30 carbon atoms, more preferably a monovalent hydrocarbyl radical having 1 to 6 carbon atoms, especially the methyl radical.

Examples of $R^4$ radicals are the radicals stated for the $R^1$ radical.

Preferably, the $R^4$ radical is a hydrogen atom or a monovalent hydrocarbyl radical having 1 to 4 carbon atoms, especially a hydrogen atom or the methyl or ethyl radical.

Preferably, the value of d is 3 or 0.

Examples of $R^5$ radicals are the examples given for the R radical.

Preferably, the $R^5$ radical is a hydrogen atom or a monovalent, optionally substituted, aliphatic hydrocarbyl radical having 1 to 30 carbon atoms, more preferably a monovalent aliphatic hydrocarbyl radical having 1 to 4 carbon atoms, especially the methyl radical.

Examples of $R^6$ radicals are the hydrogen atom and the radicals stated for the R and $R^2$ radicals.

Preferably, the $R^6$ radical is a hydrogen atom or a monovalent, optionally substituted hydrocarbyl radical having 1 to 30 carbon atoms, more preferably a hydrogen atom or a monovalent hydrocarbyl radical having 1 to 4 carbon atoms, especially the methyl or ethyl radical.

It is essential to the present invention that component (A) comprises a polyorganosiloxane (a1) containing aromatic radicals bonded directly to the silicon atom. This means that there is a covalent bond between a silicon atom in the unit of the formula (I) and a carbon atom which belongs to the aromatic ring. Component (A) is described in DE 102004040263 A1.

Preferably, the organosilicon compounds (a1) are organopolysiloxanes consisting of units of the formula (I).

Examples of component (a1) are those that contain one or more units of the formulae

where Me is a methyl radical and Ph is a phenyl radical, for example linear polysiloxanes of the formulae

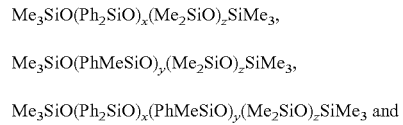

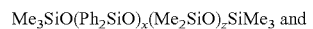

branched polysiloxanes of the formulae

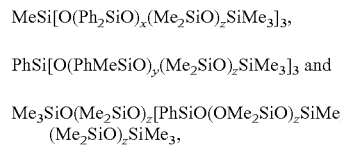

where the coefficients v, x, y independently assume values of not less than 1 and z is 0 or not less than 1. The sum total of v, x, y and z determines the degree of polymerization, and v the number of branches, and hence the viscosity.

The organosilicon compounds (a1) preferably have a viscosity of 10 to 1,000,000 mPas, more preferably 100 to 50,000 mPas, especially 500 to 5000 mPas, measured in each case at 25° C. and a shear rate of 1/s.

The organosilicon compounds (a1) are commercial products and/or can be prepared by any desired methods known to date in organosilicon chemistry, for example by cohydrolysis of the corresponding silanes.

Component (a21) preferably comprises pulverulent, preferably hydrophobic, fillers.

Component (a21) preferably has a BET surface area of 20 to 1000 m²/g, a particle size of less than 10 μm and an agglomerate size of less than 100 μm.

Examples of component (a21) are silicon dioxide (silicas), titanium dioxide, aluminum oxide, metal soaps, finely ground quartz, PTFE powders, fatty acid amides, e.g. ethylenebisstearamide, and finely divided hydrophobic polyurethanes.

Preferred for use as component (a21) are silicon dioxide (silicas), titanium dioxide or aluminum oxide, more particularly with a BET surface area of 20 to 1000 m²/g, a particle size of less than 10 μm and an agglomerate size of less than 100 μm.

Particularly preferred as component (a21) are silicas, more preferably those having a BET surface area of 50 to 800 m²/g, more particularly those having a BET surface area of 80 to 500 m²/g. These silicas may be fumed or precipitated silicas.

As component (a21) it is possible to use not only pretreated silicas, in other words commercial hydrophobic silicas, but also hydrophilic silicas. The degree of hydrophobizing is characterized by the methanol number. This number is determined in accordance with DE 2107082 A1 by placing 0.2 g of the silica into 50 ml of water. Methanol is added with stirring until the silica is completely wetted and suspended in the liquid. The methanol number is the percentage of methanol in the liquid mixture that just wets the silica. Pretreated hydrophobic silicas are preferably silicas having a methanol number of more than 30, more preferably more than 50. Examples of commercial hydrophobic silicas which can be used in accordance with the invention are HDK® H2000, a fumed silica treated with hexamethyldisilazane and having a BET surface area of 140 m²/g (available commercially from Wacker-Chemie AG, Munich, Germany), and a precipitated silica treated with polydimethylsiloxane and having a BET surface area of 90 m²/g (available commercially under the name "SIPERNAT® D10" from Evonik Resource Efficiency GmbH, Hanau, Germany).

If hydrophobic silicas are to be used as component (a21), hydrophilic silicas may also be hydrophobized in situ, if this is advantageous for the desired activity of the defoamer formulation. There are many known methods for hydrophobizing silicas. The hydrophobizing of the hydrophilic silica in situ may be accomplished, for example, by heating the silica dispersed in component (a1) to temperatures of 100 to 200° C. for a number of hours. In that case the reaction may be assisted by the addition of catalysts, such as KOH, and of hydrophobizing agents, such as short-chain, OH-terminated polydimethyl-siloxanes, silanes or silazanes. This treatment is also possible when using commercial hydrophobic silicas and may contribute to an improvement in activity.

Another option is to use a combination of silicas hydrophobized in situ with commercial hydrophobic silicas. In that case, it is preferred if 0.2 to 5 parts of pretreated hydrophobized silica are used per part of silica hydrophobized in situ.

Fillers (a22) are preferably used in the defoamer formulations of the invention in amounts of at least 1% by weight and at most 20% by weight, more preferably at most 10% by weight, based in each case on the total weight of the defoamer compound (A).

More preferably, component (a22) comprises organopolysiloxane resins consisting essentially of $R^3_3SiO_{1/2}$ (M) and $SiO_{4/2}$ (Q) units, where $R^3$ has the definition given above. These resins are also referred to as MQ resins. The molar ratio of M to Q units is preferably in the range from 0.5 to 2.0, more preferably in the range from 0.6 to 1.0. These silicone resins may also contain up to 10% by weight of Si-bonded hydroxy or alkoxy groups. $R^3$ is preferably a methyl radical.

Preferably, the organopolysiloxane resins (a22) at 25° C. have a viscosity greater than 1000 mPas or are solids. The weight-average molecular weight determined by gel permeation chromatography (based on a polystyrene standard) of these resins is preferably 200 to 200,000 g/mol, especially 1000 to 20,000 g/mol.

Preferably, the organopolysiloxane resins (a22) used in accordance with the invention are soluble to an extent of at least 100 g/L in benzene at a temperature of 25° C. and a pressure of 101.325 kPa.

Siloxane resins (a22) are preferably used in the defoamer formulations of the invention in amounts of at least 1% by weight and at most 20% by weight, more preferably at most 10% by weight, based in each case on the total weight of the defoamer compound (A).

Preferably, any organosilicon compounds (a3) used are organopolysiloxanes consisting of units of the formula (III).

The organopolysiloxanes (a3) preferably have a viscosity of 10 to 1,000,000 mm²/s at 25° C.

Examples of organopolysiloxanes (a3) optionally used in accordance with the invention are those that are different than organopolysiloxanes (a1) and do not contain any aromatic radicals bonded directly to silicon, for instance polydimethylsiloxanes having viscosities of 100 to 1,000,000 mPa·s at 25° C. These polydimethylsiloxanes may be branched, for example, via the incorporation of $R^5SiO_{3/2}$ or $SiO_{4/2}$ units up to a maximum of 5% of all units, where $R^5$ is as defined above. These branched or lightly crosslinked siloxanes then have viscoelastic properties.

The component (a3) which is optionally used preferably comprises essentially linear organopolysiloxanes comprising units of the formula (III), more preferably polydimethylsiloxanes which may be terminated by silanol groups and/or by alkoxy groups and/or by trimethylsiloxy groups.

As component (a3) it is also possible to use organosilicon compounds containing structural units of the general formula (III) in which $R^5$ is a methyl radical and $R^6$ is a linear and/or branched hydrocarbyl radical having at least 6 carbon atoms, h assumes an average value of 0.005 to 0.5, and the sum (g+h) has an average value of 1.9 to 2.1. Products of this kind are obtainable, for example, by alkali-catalyzed condensation of silanol-terminated polydimethylsiloxanes having a viscosity of 50 to 50,000 mPa·s at 25° C. with aliphatic alcohols having more than 6 carbon atoms, such as isotridecyl alcohol, n-octanol, stearyl alcohol, 4-ethylhexadecanol, or eicosanol.

If the compositions of the invention comprise component (a3), the amounts are preferably 1% to 90% by weight, more preferably 2% to 50% by weight, and especially 2% to 10% by weight based in each case on the total weight of the defoamer compound (A).

The defoamer formulations of the invention preferably contain 10-90% by weight, more preferably 20-80% by weight, and especially 30-70% by weight, of components (A).

Components (B) are preferably polyoxyalkylenes of the formula

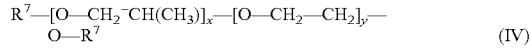

(IV)

in which $R^7$ may be the same or different and is a hydrogen atom, a $C_1$-$C_{30}$-alkyl radical, a $C_1$-$C_{30}$-alkenyl radical or a radical of the formula $R^8$—C(O)— (V)
in which $R^8$ is a $C_1$-$C_{22}$-alkyl radical,
x has a value of 6 to 300 and
y has a value of 0 to 30
and the ratio y/x is 0 to 1.

Examples of $R^7$ radicals are the hydrogen atom and the methyl, allyl and butyl radical. Preferably, the $R^7$ radical is a hydrogen atom.

Examples of radicals of the formula $R^8$ are the methyl and butyl radicals.

In the formula (IV), the index x is preferably 15 to 150, more preferably 25 to 100. The ratio y/x is preferably 0 to 0.75, more preferably 0 to 0.25, especially 0 to 0.1. In a particularly preferred variant, y=0.

Preferably, the polyoxyalkylenes of the formula (IV) have an average molar mass (number-average Mn) of 100 to 20,000, more preferably 200 to 12,000.

The polyoxyalkylenes used are preferably polypropylene glycols having an average molar mass (number-average Mn) of 100 to 8000 g/mol.

It is possible to use one kind of polyoxyalkylene (B) or several kinds of polyoxyalkylenes (B).

The oxyalkylene groups may be in random distribution in the polyoxyalkylenes of the formula (I) or may be in the form of block copolymers.

Polyoxyalkylenes of the formula (IV) are known commercial products. According to the values of x and y, the polyoxyalkylenes are liquid or waxy products, preference being given to liquid products having a viscosity (at 25° C. and 1013 hPa) of 100 to 1500 mm$^2$/s.

The solubility of the polyoxyalkylenes in water is determined by the ratio of y/x. Preference is given to using polyoxyalkylenes that are soluble in water to an extent of less than 2% by weight at 25° C. and 1013 hPa, or have a cloud point (measured according to EN 1890 Variant A) of less than 35° C., especially less than 25° C.

The defoamer formulations of the invention comprise preferably 10-90% by weight, more preferably 20-80% by weight, especially 30-70% by weight, of components (B).

Substances used as component (B) are commercial products.

Any polyether-modified siloxanes (C) used additionally are preferably polyether-polysiloxane copolymers, which may be linear or branched polymers.

Polyether-polysiloxane copolymers of these kinds are prior art and are known to the skilled person.

Examples of linear polyether-polysiloxane copolymers are those in which the polyether radicals are pendently SiC-bonded to linear siloxane chains via hydrocarbyl radicals, preferably divalent hydrocarbyl radicals.

Linear polyether-polysiloxane copolymers of this kind are described for example in GB 2 350 117 A.

Examples of branched polyether-polysiloxane copolymers are those in which the polyether radicals are pendently SiC-bonded to linear siloxane chains via hydrocarbyl radicals, preferably divalent hydrocarbyl radicals, and where these linear siloxane chains are connected to one another via pendent organic bridges.

Examples of these organic bridges are SiC-bonded linear or branched organic radicals, preferably divalent hydrocarbyl radicals, which may contain one or more heteroatoms selected from the group of oxygen atoms and nitrogen atoms, such as alkylene radicals, SiC-bonded polyether radicals bonded to the siloxane chains via alkylene radicals, and SiC-bonded divalent hydrocarbyl radicals, such as alkylene radicals, which contain polyether groups and urethane groups.

Of particularly good suitability are branched polyether-polysiloxane copolymers of the kind described as a component of defoamers in, for example, EP 1 076 073 A1, EP 1 424 117 A2 or WO 2006/128624 A1.

Branched polyether-polysiloxane copolymers used with preference are those in which the siloxane chains are bonded to one another via pendent, divalent, SiC-bonded hydrocarbyl radicals which contain polyether radicals and urethane groups.

These polyether-polysiloxane copolymers and their preparation are described in WO 2006/128624 A1, particularly at page 3, line 8 to page 13, line 38, which is hereby incorporated by reference.

In the defoamer compositions of the invention, the polyether-polysiloxane copolymers (C) are preferably used in amounts of 0% to 60% by weight, more preferably 0% to 40% by weight, yet more preferably 1% to 30% by weight, and especially 1% to 10% by weight, based in each case on the total weight of the defoamer composition.

Apart from components (A), (B) and optionally (C), the compositions of the invention may comprise any further substances as have also been used to date in defoamer formulations, for example organic compounds (D).

Any component (D) used preferably comprises organic compounds having a boiling point of greater than 100° C. under the pressure of the surrounding atmosphere, in other words at 900 to 1100 hPa, and more preferably compounds which cannot be distilled without decomposition, and most preferably compounds selected from mineral oils, natural oils, isoparaffins, polyisobutylenes, residues from the oxo synthesis of alcohols, esters of low molecular mass synthetic carboxylic acids such as 2,2,4-trimethylpentane-3,3-diol diisobutyrates, fatty acid esters such as octyl stearate and dodecyl palmitate, fatty alcohols, ethers of low molecular mass alcohols, phthalates, glycols such as 1,2-propanediol glycol ethers, esters of phosphoric acid, and waxes.

The organic compounds (D) are preferably used in the defoamer compositions of the invention in amounts of 0% to 60% by weight, more preferably 0% to 20% by weight, especially 1% to 20% by weight, based in each case on the total weight of the defoamer composition. The defoamer compositions of the invention preferably do not contain any component (D).

In the defoamer compositions of the invention, water (E) is preferably used in amounts of not more than 5% by weight, more preferably not more than 1% by weight, based in each case on the total weight of the defoamer composition. The defoamer compositions of the invention preferably do not contain any added water, meaning that the additional use of water in the defoamer compositions of the invention is ruled out.

Additives (F) may be any known additives, for example those selected from organic thickening polymers, preservatives, dyes and fragrances. It is also possible to additionally use alkaline or acidic catalysts. Examples of alkaline catalysts are alkali metal and alkaline earth metal hydroxides, such as NaOH, KOH, CsOH, LiOH and Ca(OH)$_2$. Examples of acidic catalysts are hydrochloric acid, sulfuric acid, and phosphorus nitride chlorides.

The catalysts can be dosed in typical organic solvents such as alcohols (for example methanol, ethanol, isopropanol) or esters (for example ethyl acetate).

The defoamer compositions of the invention preferably consist of
(A) 10% to 90% by weight of defoamer compound of the invention,
(B) 10% to 90% by weight of polyoxyalkylenes of the invention,
(C) 0% to 10% by weight, preferably 1 to 10% by weight, of polyether-modified siloxanes,
(D) 0% to 20% by weight, preferably 1% to 20% by weight, of organic compounds,
(E) 0% to 1% by weight of water, and
(F) 0% to 10% by weight of further additives, based in each case on the total weight of the defoamer compositions.

The compositions of the invention are preferably viscous clear to opaque, and colorless to brownish liquids.

The compositions of the invention preferably have a viscosity of 1 to 20,000 mPas, more preferably 5 to 5000 mPas, and especially 10 to 2000 mPas, in each case at 25° C. and a shear rate of 1/s.

The compositions of the invention may be solutions or dispersions.

The compositions of the invention can be produced by known methods, for example by mixing all components, for example by simple stirring with static mixers or else using high shear forces in colloid mills, dissolvers and rotor-stator homogenizers.

The present invention further provides surfactant formulations, preferably wetting compositions, washing compositions and cleaning compositions, preferably wetting compositions, washing compositions and cleaning compositions that are liquid at 20° C., especially liquid washing compositions, comprising the compositions of the invention.

The present invention further provides a method of defoaming and/or of preventing foaming of media, characterized in that the composition of the invention is mixed with the medium.

The composition of the invention can be added directly to the foaming media, dissolved in suitable solvents, such as toluene, xylene, methyl ethyl ketone or tert-butanol, or in powder form. The amount necessary to achieve the desired defoamer effect is guided, for example, by the nature of the medium, the temperature and the turbulence that occurs.

Preferably, the compositions of the invention are mixed directly with concentrated liquid surfactant formulations, for example liquid washing compositions.

Preferably, the compositions of the invention are added in amounts of 0.1 ppm by weight to 1% by weight, especially in amounts of 1 to 100 ppm by weight, to the ready-to-use foaming medium. In concentrated surfactant formulations, such as liquid washing compositions, the compositions of the invention may be present to an extent of 0.1% to 20% by weight, especially to an extent of 0.5% to 5% by weight.

The process of the invention is preferably conducted at temperatures of −10 to +150° C., more preferably 5 to 100° C., and the pressure of the surrounding atmosphere, i.e. about 900 to 1100 hPa. The process of the invention can also be conducted at higher or lower pressures, for instance at 3000 to 4000 hPa or 1 to 10 hPa.

The defoamer compositions of the invention can be used wherever disruptive foam is to be suppressed. This is the case, for example, in nonaqueous media, as in tar distillation or mineral oil processing. The defoamer compositions of the invention are particularly suitable for controlling foam in aqueous media, preferably in aqueous surfactant formulations, such as employment in washing and cleaning compositions, the control of foam in wastewater treatment plants, in textile dyeing processes, in natural gas scrubbing, in polymer dispersions, and are usable for defoaming of aqueous media obtained in pulp production.

More particularly, the defoamer compositions of the invention are suitable as a constituent of liquid washing compositions, where they are notable for excellent compatibility and efficacy.

The compositions of the invention have the advantage that they are easily usable as defoamers and miscible with concentrated surfactant formulations, and that they feature high, long-lasting efficacy in a wide variety of different media with small added amounts. This is exceptionally advantageous both in economic and ecological terms.

The viscosity of the individual components and of the defoamer compositions is determined according to DIN 53019-1 (2008-09), DIN 53019-2 (2001-02) and DIN 53019 (2008-09) with a cone-plate viscometer at 25° C. and a shear rate of 1/s.

In the examples which follow, all figures for parts and percentages, unless otherwise indicated, are based on weight. Unless stated otherwise, the examples which follow are conducted under the pressure of the surrounding atmosphere, in other words at approximately 1000 hPa, and at room temperature, in other words approximately 20° C., or at a temperature which is established when the reactants are combined at room temperature without additional heating or cooling. The viscosity was determined with an MCR 300 cone-plate viscometer (Paar-Physika) at 25° C. and a shear rate of 1/s.

Production of the Washing Composition Formulation for Testing of Efficacy and Compatibility 168.40 g of an alkoxylated fatty alcohol (available under the tradename Lutensol® AO 8 from BASF SE) were melted at 50° C. 30.88 g of lauric acid and 7.02 g of potassium hydroxide were added and stirred briefly, then 462.52 g of demineralized water having a temperature of 50° C. were added and mixed. After everything had dissolved homogeneously, 190.85 g of a sodium $C_{14-17}$-alkyl-sulfonate (available under the Hostapur SAS 60 name from Clariant International Ltd.), 28.07 g of sodium tetraborate and 56.13 g of sodium citrate were stirred in until everything had dissolved. Finally, 56.13 g of propane-1,2-diol were also mixed in.

Tests of Compatibility

To test the defoamer efficacy, the amounts of the defoamer formulations specified in table 2 are added in each case to this liquid washing composition. Compatibility was assessed visually after storage at 40° C. for 14 days.

Tests of Defoamer Efficacy 100 g of the defoamer-containing liquid washing composition were then introduced together with 3500 g of clean cotton laundry into a drum washing machine (model: Miele Novotronik W918 without fuzzy logic). Subsequently, the wash program was started (at 30° C.) and the foam height in % based on the drum volume was recorded over a period of 55 minutes. The average foam height is reported as the foam grade. 0% means absolutely no foam over the entire test duration and 100% means that the drum has been completely filled with foam over the entire test duration.

The Defoamer Compounds (A) Used for the Formulations

Defoamer Compound A1 (Noninventive)

Defoamer compound A1 is SILFOAM® SC 1132, commercially available from Wacker Chemie AG Munich; this compound is based on polydimethylsiloxane.

Defoamer Compound A2 (Noninventive; No Component (a1) Having Aromatic Radicals Bonded Directly to the Silicon Atom)

Defoamer compound A2 was prepared as follows:

90 parts of a diorganopolysiloxane terminated with trimethylsiloxy groups, composed of 20 mol % of 2-phenylpropenylmethylsiloxane and 80 mol % of dodecylmethylsiloxane units, which had a viscosity of 1000 mPas (available under the tradename TN Release Agent from Wacker Chemie AG Munich), 5 parts of a fumed silica having a BET surface area of 300 $m^2/g$ (available under the HDK® T30 name from Wacker Chemie AG Munich), 5 parts of a hydrocarbon mixture (D1) having a boiling range of 235-270° C. (commercially available under the Exxsol D 100 S name from Staub & Co Nuremberg, Germany), 5 parts of a room temperature solid silicone resin consisting of the following units (by $^{29}Si$ NMR and IR analysis): 40 mol % of $CH_3SiO_{1/2}$—, 50 mol % of $SiO_{4/2}$—, 8 mol % of $C_2H_5OSiO_{3/2}$— and 2 mol % of $HOSiO_{3/2}$—, where this resin has a weight-average molar mass of 7900 g/mol (based on polystyrene standard), and 0.7 part of a 20% by weight methanolic KOH were mixed with a dissolver and heated to 150° C. for 4 hours. A defoamer having a viscosity of 6000 mPas was obtained.

Defoamer Compound A3 (Noninventive, No Component (a1) Having Aromatic Radicals Bonded Directly to the Silicon Atom)

Defoamer compound A3 was prepared as follows:

75 parts of a diorganopolysiloxane terminated by trimethyl-siloxy groups, composed of 52 mol % of 2-phenyl-propenyl-methylsiloxane and 48 mol % of dimethylsiloxane units, which had a viscosity of 2160 mPas (obtained by reaction of 139 g of a siloxane $(CH_3)_3$—Si—O—[SiH $(CH_3)$—O$]_{40}$—[Si$(CH_3)_2$—O$]_{37}$—Si$(CH_3)_3$ with 126 g of alpha-methylstyrene (2-phenylpropene) in the presence of a platinum catalyst), 5 parts of a fumed silica having a BET surface area of 300 $m^2/g$ (available under the trademark HDK® T30 from Wacker Chemie AG Munich), 10 parts of a polydimethylsiloxane having a viscosity of 10 mPas, 5 parts of a polydimethylsiloxane having a viscosity of 5 mPas, 5 parts of a room temperature solid silicone resin consisting of the following units (by $^{29}$Si NMR and IR analysis): 40 mol % of $CH_3SiO_{1/2}$—, 50 mol % of $SiO_{4/2}$—, 8 mol % of $C_2H_5OSiO_{3/2}$— and 2 mol % of $HOSiO_{3/2}$—, where this resin has a weight-average molar mass of 7900 g/mol (based on polystyrene standard), and 0.7 part of a 20% by weight methanolic KOH were mixed with a dissolver and heated to 150° C. for 4 hours. A cream-like defoamer was obtained.

Defoamer Compound A4 (Noninventive, No Component (a1) Having Aromatic Radicals Bonded Directly to the Silicon Atom)

Defoamer compound A4 was prepared as follows:

85 parts of a diorganopolysiloxane terminated by trimethylsiloxy groups, composed of 25 mol % of norbornylmethylsiloxane units and 75 mol % of octylmethylsiloxane units, which has a viscosity of 3260 mPas (obtained by reaction of 130 g of a siloxane of the formula $(CH_3)_3$—Si—O—[Si$(CH_3)$H—O$]_{54}$—Si$(CH_3)$ with 50 g of norbornene, 270 g of 1-octene and 11 g of a polydimethylsiloxane terminated by dimethylvinylsiloxy groups, having a viscosity of 20 mPas, in the presence of a platinum catalyst), 5 parts of a fumed silica having a BET surface area of 300 $m^2/g$ (available under the trademark HDK® T30 from Wacker Chemie AG Munich), 5 parts of a hydrocarbon mixture (D1) having a boiling range of 235-270° C. (commercially available under the Exxsol D 100 S name from Staub & Co Nuremberg, Germany), 5 parts of a room temperature solid silicone resin consisting of the following units (by $^{29}$Si NMR and IR analysis): 40 mol % of $CH_3SiO_{1/2}$—, 50 mol % of $SiO_{4/2}$—, 8 mol % of $C_2H_5OSiO_{3/2}$— and 2 mol % of $HOSiO_{3/2}$—, where this resin has a weight-average molar mass of 7900 g/mol (based on polystyrene standard), and 0.7 part of a 20% by weight methanolic KOH were mixed with a dissolver and heated to 150° C. for 4 hours. A defoamer having a viscosity of 8710 mPas was obtained.

Defoamer Compound A5 (Noninventive, No Component (B))

Defoamer compound A5 was prepared as follows:

88 parts of a silicone oil having a viscosity of 1000 $mm^2/s$, which, according to $^{29}$Si NMR, consists of the following constituents (in mol %):

| | |
|---|---|
| $Me_3SiO_{(1/2)}$ | 2.9% |
| $Me_2SiO_{(2/2)}$ | 34.7% |
| $Me_2Si(OH)O_{(1/2)}$ | 0.4% |
| $PhSi(Me)O_{(2/2)}$ | 61.0% |
| $PhSiO_{(3/2)}$ | 1.0% |

(available under the AP 1000 silicone oil name from Wacker Chemie AG Munich), 5 parts of a fumed silica having a BET surface area of 300 $m^2/g$ (available under the trademark HDK® T30 from Wacker Chemie AG Munich), 5 parts of a hydrocarbon mixture (D1) having a boiling range of 235-270° C. (commercially available under the Exxsol D 100 S name from Staub & Co Nuremberg, Germany), 5 parts of a room temperature solid silicone resin consisting of the following units (by $^{29}$Si NMR and IR analysis): 40 mol % of $CH_3SiO_{1/2}$—, 50 mol % of $SiO_{4/2}$—, 8 mol % of $C_2H_5OSiO_{3/2}$— and 2 mol % of $HOSiO_{3/2}$—, where this resin has a weight-average molar mass of 7900 g/mol (based on polystyrene standard), and 0.7 part of a 20% by weight methanolic KOH were mixed with a dissolver and heated to 150° C. for 4 hours. A defoamer having a viscosity of 3000 mPas was obtained.

Defoamer Compound A6

Defoamer compound A6 was prepared as follows:

42.5 parts of an AP 1000 silicone oil from example A5, 42.5 parts of a liquid silicone resin having a viscosity of 140 mPas, which, according to $^{29}$Si NMR, consists of the following constituents (in mol %):

| | |
|---|---|
| $Me_2SiO_{(2/2)}$ | 33.0% |
| $Me_2Si(OR)O_{(1/2)}$ | 4.5% |
| $Ph(OR)SiO_{(2/2)}$ | 28.8% |
| $Ph(OR)_2SiO_{(1/2)}$ | 11.5% |
| $PhSiO_{(3/2)}$ | 22.2% | where R is a mixture of methyl and butyl radical, (available under the SILRES® SY 231 name from Wacker Chemie AG Munich), 5 parts of a fumed silica having a BET surface area of 300 $m^2/g$ (available under the HDK® T30 name from Wacker Chemie AG Munich), 5 parts of a room temperature solid silicone resin consisting of the following units (by $^{29}$Si NMR and IR analysis): 40 mol % of $CH_3SiO_{1/2}$—, 50 mol % of $SiO_{4/2}$—, 8 mol % of $C_2H_5OSiO_{3/2}$— and 2 mol % of $HOSiO_{3/2}$—, where this resin has a weight-average molar mass of 7900 g/mol (based on polystyrene standard), and 0.7 part of a 20% by weight methanolic KOH were mixed with a dissolver and heated to 150° C. for 4 hours. A defoamer having a viscosity of 1980 mPas was obtained.

Defoamer Compound A7

Defoamer compound A7 was prepared analogously to A6, with the alteration that 60 parts silicone oil and 25 parts silicone resin were used.

A defoamer having a viscosity of 2320 mPas was obtained.

Defoamer Compound A8

Defoamer compound A8 was prepared as follows:

45 parts of a diorganopolysiloxane terminated by trimethylsiloxy groups, composed of 52 mol % of 2-phenyl-propenylmethysiloxane and 48 mol % of dimethylsiloxane units from example A3, 35 parts of AP 1000 phenylsilicone oil from example A5, 5 parts of a polydimethylsiloxane having a viscosity of 100 mPas, 5 parts of a room temperature solid silicone resin consisting of the following units (by $^{29}$Si NMR and IR analysis): 40 mol % of $CH_3SiO_{1/2}$—, 50 mol % of $SiO_{4/2}$—, 8 mol % of $C_2H_5OSiO_{3/2}$— and 2 mol % of $HOSiO_{3/2}$—, where this resin has a weight-average molar mass of 7900 g/mol (based on polystyrene standard), 5 parts of a fumed silica having a BET surface area of 300 m$^2$/g (available under the trademark HDK® T30 from Wacker Chemie AG Munich), and 0.7 part of a 20% by weight methanolic KOH were mixed with a dissolver and heated to 150° C. for 4 hours. A cream-like defoamer having a viscosity of 57 800 mPas was obtained.

The polyethers (B) used for the formulations:
B1: a polypropylene glycol having a viscosity of about 300 mPas (available under the tradename Pluriol P 2000 from BASF SE in Ludwigshafen, Germany);
B2: a polypropylene-polyethylene glycol copolymer with 10% polyethylene glycol and a viscosity of about 350 mPas (available under the tradename Pluronic PE 6100 from BASF SE in Ludwigshafen, Germany)

The polyether-modified siloxane (C1) used for the formulations is a branched polyethersiloxane which has been prepared according to EP 1885770 B1, paragraphs [0083-0084], working example (B), polymer 1, and has a viscosity of 5490 mPas at a shear rate of 1/s.

Examples of Noninventive and Inventive Defoamer Formulations

The individual defoamer formulations were produced by simple mixing of all components specified in table 1 (figures in % by weight) with a dissolver disk.

The noninventive defoamer compositions according to comparative experiments C2 to C4 contain an organopolysiloxane in which the aromatic hydrocarbyl radicals are not bonded directly to the silicon atom via a ring carbon atom, but via an aliphatic hydrocarbyl radical. Table 1 shows that the noninventive defoamer compositions C2 to C4 are inhomogeneous and have phase separation, and so they are unsuitable for use as defoamer. By contrast, the inventive defoamer compositions according to examples 1 to 6 are homogeneous compositions, which is a prerequisite for the use thereof as defoamer in liquid washing compositions.

The defoamer effect of the formulations thus produced is tested in liquid washing compositions, the production of which has been described above, and the results are collated in table 2.

TABLE 2

Testing of the defoamer formulations in the liquid washing composition

| Examples/ Comparative Examples | Dosage in % by weight | Foam grade immediate in % | Foam grade after storage for 8 weeks in % | Compatibility |
| --- | --- | --- | --- | --- |
| C1 (noninventive) dimethylsiloxane | 0.25 | 10 | 64 | deposits, streaks |
| C5 (noninventive) without (B) | 0.05 | 0 | 46 | deposits, incompatible |
| 1 (inventive) phenylsiloxane | 0.0625 | 0 | 12 | compatible |
| 2 (inventive) phenylsiloxane | 0.05 | 5 | 7 | compatible |
| 3 (inventive) phenylsiloxane | 0.0625 | 20 | 18 | compatible |
| 4 (inventive) phenylsiloxane | 0.0625 | 22 | 6 | compatible |
| 5 (inventive) phenylsiloxane | 0.0625 | 5 | 15 | compatible |

TABLE 1

| Examples/Comparative Examples | Component (A) | Component (B) | Component (C) | Appearance/ viscosity |
| --- | --- | --- | --- | --- |
| C1 (noninventive) dimethylsiloxane | 40 A1 | 24 B1 34 B2 | 2 C1 | white homogeneous |
| C2 (noninventive) dodecylmethyl-alpha-methylstyrylmethylsiloxane | 40 A2 | 24 B1 34 B2 | 2 C1 | inhomogeneously separated, no further testing possible |
| C3 (noninventive) dimethyl-alpha-methylstyrylmethylsiloxane | 40 A3 | 58 B1 | 2 C1 | inhomogeneously separated, no further testing possible |
| C4 (noninventive) norbornyloctylmethylsiloxane | 40 A4 | 58 B1 | 2 C1 | inhomogeneously separated, no further testing possible |
| C5 (noninventive) without (B) | 100 A5 | — | — | homogeneous |
| 1 (inventive) phenylsiloxane | 40 A5 | 24 B1 34 B2 | 2 C1 | gray homogeneous 666 mPas |
| 2 (inventive) phenylsiloxane | 50 A5 | 24 B1 24 B2 | 2 C1 | gray homogeneous 830 mPas |
| 3 (inventive) phenylsiloxane | 40 A6 | 24 B1 34 B2 | 2 C1 | gray homogeneous 770 mPas |
| 4 (inventive) phenylsiloxane | 40 A7 | 60 B1 | — | white homogeneous 790 mPas |
| 5 (inventive) phenylsiloxane | 40 A7 | 58 B1 | 2 C1 | gray homogeneous 730 mPas |
| 6 (inventive) phenylsiloxane and dimethyl-alpha-methylstyrylmethylsiloxane | 40 A8 | 58 B1 | 2 C1 | gray homogeneous 1730 mPas |

TABLE 2-continued

Testing of the defoamer formulations
in the liquid washing composition

| Examples/<br>Comparative<br>Examples | Dosage<br>in % by<br>weight | Foam grade<br>immediate<br>in % | Foam grade<br>after storage<br>for 8 weeks<br>in % | Compatibility |
|---|---|---|---|---|
| 6 (inventive)<br>phenylsiloxane | 0.0625 | 12 | 19 | compatible |

As can be inferred from table 2, the inventive defoamer formulations according to examples 1 to 6 have good compatibility with the liquid washing composition, whereas the noninventive defoamer formulation C5 which does not contain any component (B), i.e. any polypropylene glycol or polypropylene glycol-polyethylene glycol copolymer, has deposits and is incompatible with the liquid washing composition. The use of the noninventive defoamer formulation C1 based on dimethylpolysiloxane, which does not include any component (a1), i.e. any phenylsiloxane, leads to deposits and streaks in the liquid washing composition, which is undesirable.

In addition, table 2 shows that the inventive defoamer formulations according to examples 1 to 6 have good defoamer action, especially after storage of the defoamer formulation in the liquid washing composition, by contrast with the noninventive defoamer formulations C1 and C5, which have much poorer defoamer action particularly after storage of the defoamer formulation in the liquid washing composition.

The invention claimed is:

1. A defoamer preparation, comprising
(A) a defoamer composition, comprising
(a1) at least one organosilicon compound comprising units of the formula $$R_a(R^1O)_bR^2_cSiO_{(4-a-b-c)/2} \quad (I)$$

in which
R is the same or different and is hydrogen or a monovalent, SiC-bonded, optionally substituted, aliphatic hydrocarbyl radical, or aromatic hydrocarbyl radical bonded to silicon via aliphatic groups,
$R^1$ is the same or different and is hydrogen or a monovalent, optionally substituted hydrocarbyl radical,
$R^2$ is the same or different and is a monovalent, optionally substituted, aromatic hydrocarbyl radical bonded to silicon via a ring carbon atom,
a is 0, 1, 2 or 3,
b is 0, 1, 2 or 3 and
c is 0, 1, 2 or 3,
with the proviso that the sum total of a+b+c is not more than 3 and, in 1-100% of all units of the formula (I), c is different than 0 and, in at least 50% of all units of the formula (I), the sum total of a+b+c in the organosilicon compound is 2,
(a2) at least one additive selected from
(a21) filler particles and/or
(a22) organopolysiloxane resin(s) comprising units of the formula $$R^3_d(R^4O)_eSiO_{(4-d-e)/2} \quad (II)$$

in which
$R^3$ is the same or different and is hydrogen or a monovalent, optionally substituted, SiC-bonded hydrocarbyl radical,
$R^4$ is the same or different and is hydrogen or a monovalent, optionally substituted hydrocarbyl radical,
d is 0, 1, 2 or 3 and
e is 0, 1, 2 or 3, with the proviso that the sum total of d+e is not more than 3 and, in less than 50% of all units of the formula (II), the sum total of d+e in the organopolysiloxane resin is 2,
and optionally
(a3) an organosilicon compound comprising units of the formula $$R^5_g(R^6O)_hSiO_{(4-g-h)/2} \quad (III)$$

in which
$R^5$ is the same or different and has the definition specified for R,
$R^6$ is the same or different and has the definition specified for R',
g is 0, 1, 2 or 3 and
h is 0, 1, 2 or 3,
with the proviso that the sum total of g+h is not more than 3 and, in at least 50% of all units of the formula (III), the sum total of g+h in the organosilicon compound is 2,
(B) polypropylene glycols, terminally etherified or esterified polypropylene glycols, polypropylene glycol/polyethylene glycol copolymers, terminally etherified or esterified polypropylene glycol/polyethylene glycol copolymers, and mixtures thereof,
(C) optionally, polyether-modified siloxanes,
(D) optionally, organic compounds, and
(F) optionally, further additives.

2. The defoamer preparation of claim 1, wherein R is a monovalent aliphatic hydrocarbyl radical having 1 to 4 carbon atoms, and $R^2$ is an aryl radical.

3. The defoamer preparation of claim 1, wherein R is methyl and $R^2$ is phenyl.

4. The defoamer preparation of claim 1, wherein 10 to 100 mol % of the SiC-bonded radicals in component (a1) are $R^2$ radicals.

5. The defoamer preparation of claim 2, wherein 10 to 100 mol % of the SiC-bonded radicals in component (a1) are $R^2$ radicals.

6. The defoamer preparation of claim 1, wherein water is additionally present in amounts of not more than 5% by weight, based in each case on the total weight of the defoamer preparation.

7. The defoamer preparation of claim 1, wherein water is additionally present in amounts of not more than 1% by weight, based in each case on the total weight of the defoamer preparation.

8. The defoamer preparation of claim 1, wherein no additional water is present.

9. The defoamer preparation of claim 1, wherein component (a22) comprises organopolysiloxane resins consisting essentially of $R^3_3SiO_{1/2}$ (M) and $SiO_{4/2}$ (Q) units, and the molar ratio of M to Q units is in the range of from 0.5 to 2.0 and up to 10% by weight of Si-bonded hydroxy or alkoxy groups are optionally present.

10. The defoamer preparation of claim 1, wherein component (a21) comprises silicas having a BET surface area of 50 to 800 m²/g.

11. The defoamer preparation of claim 1, wherein component (B) comprises at least one polyoxyalkylene of the formula $$R^7-[O-CH_2-CH(CH_3)]_x-[O-CH_2-CH_2]_y-O-R^7 \quad (IV)$$

in which $R^7$ is the same or different and is hydrogen, a $C_1$-$C_{30}$-alkyl radical, a $C_1$-$C_{30}$-alkenyl radical or a radical of the formula $R^8-C(O)-$ (V),
$R^8$ is a $C_1$-$C_{22}$-alkyl radical,
x has a value of 6 to 300 and
y has a value of 0 to 30
and the ratio y/x is 0 to 1.

12. The defoamer preparation of claim 1, comprising:
10% to 90% by weight of defoamer composition (A)
10% to 90% by weight of (B)
0 to 10% by weight of polyether-modified siloxanes (C)
0% to 20% by weight of organic compounds (D)
0 to 1% by weight of water (E), and
0% to 10% by weight of further additives (F)
based in each case on the total weight of the defoamer composition.

13. A surfactant formulation comprising a defoamer preparation of claim 1.

14. The surfactant formulation of claim 13, which is a wetting agent, washing composition, or cleaning composition.

15. A method of defoaming and/or preventing foaming of a medium comprising mixing at least one defoamer preparation of claim 1 with the medium.

16. The method of claim 15, wherein the medium is an aqueous medium.

17. The method of claim 15, wherein the defoamer composition is added to the medium in amounts of 0.1 ppm by weight to 1% by weight.

18. The defoamer preparation of claim 1, wherein component (B) has a solubility in water of less than 2% by weight at 25° C. and 1013 hPa.

* * * * *